Patented Oct. 21, 1941

2,259,563

UNITED STATES PATENT OFFICE 2,259,563

METHOD OF MAKING GUANYL UREA SULPHAMATE

William H. Hill, Mount Lebanon, Pa., assignor to American Cyanamid Company, New York, N. Y., a corporation of Maine No Drawing. Application December 30, 1939, Serial No. 311,939

4 Claims. (Cl. 260—553)

The present invention relates to methods for producing guanyl urea sulphamate.

The formation of this substance may be readily accomplished by hydrolyzing dicyandiamid with sulphamic acid in the presence of water. As a result of this reaction, a melt is formed containing guanyl urea sulphamate from which this substance may be readily obtained in a purer state by recrystallization from water.

Guanyl urea sulphonic acid may be obtained from guanyl urea sulphamate by heating the latter to from 140 to 180° C. As a result of this reaction, there is evidence that some ammonium guanyl urea sulphonate is formed. The yields of the free acid may, therefore, be increased by digesting the crude melt with water and a mineral acid, such as sulphuric acid, or by protracted heating of the melt until no more ammonia is evolved.

Example I 490 grams of sulphamic acid were mixed with 420 grams of dicyandiamid and 360 cc. of water to form a thin paste. The mix was then heated, during which time it assumed a yellow color and became more fluid. When the temperature reached 75° C., it was evident that a reaction was rapidly progressing and became violent at 95° C. At this point, the source of heat was removed, although the temperature continued to rise to approximately 115° C. The reaction continued at this temperature for some time during which period steam escaped and a clear yellow melt resulted. After cooling, the solid product was dissolved in water and a white crystalline solid, identified as guanyl urea sulphamate, recovered therefrom.

Upon heating either the crude melt containing guanyl urea sulphamate or the recrystallized product to 160° C., the melt becomes foamy and ammonia escapes. After the reaction had subsided, the product was found to contain substantial quantities of guanyl urea sulphonic acid containing some of the ammonia salt thereof. A purer acid was obtained by digesting the crude melt with water and a mineral acid such as sulphuric acid to liberate additional quantities of guanyl urea sulphonic acid. The latter was recovered in purified form by recrystallization from water.

Example II

Molar proportions of dicyandiamid, sulphamic acid and water were slowly heated together. Suddenly, at about 80 to 100° C., a violent reaction took place, the contents of the beaker rising to the rim, then subsiding. The resultant product was a thick, glassy material, perfectly clear, which gave with copper sulphate and sodium hydroxide a test indicating a mixture of sulphonate and sulphamate since the solution was colored pink and contained a small amount of a pink precipitate. Continued heating in the neighborhood of 160° C. and until no more ammonia was evolved, resulted in a clear yellow melt which, when the same was leached with water, was found to be substantially pure guanyl urea sulphonic acid contaminated with a minimum amount of the ammonium salt.

This application is a continuation in part of applicant's co-pending application Serial No. 305,176, filed November 18, 1939.

While the invention has been described with particular reference to specific embodiments, it is to be understood that it is not to be limited thereto but is to be construed broadly and restricted solely by the scope of the appended claims.

I claim:

1. A method of making guanyl urea sulphamate which comprises hydrolyzing dicyandiamid in the presence of sulphamic acid and water and recovering guanyl urea sulphamate therefrom.

2. The method of claim 1 in which molar proportions of sulphamic acid, dicyandiamid and water are used.

3. The method of claim 1 in which sulphamic acid, dicyandiamid and water are heated to substantially 75° C.

4. The method of claim 1 in which the initial reaction mixture comprises essentially sulphamic acid, dicyandiamid and water in substantially the proportions of 490:420:360, respectively, the mixture being heated to substantially 75° C. whereby a clear yellow melt results, treating the melt with water and recrystallizing guanyl urea sulphamate therefrom.

WILLIAM H. HILL.